April 22, 1941. M. E. CHANDLER ET AL Re. 21,774

CARBURETOR

Original Filed Feb. 5, 1935 4 Sheets-Sheet 1

Inventors:
Milton J. Kittler
and Milton E. Chandler.
By:- John A. Watson
Att'y.

CARBURETOR

Original Filed Feb. 5, 1935 4 Sheets-Sheet 2

Inventors:
Milton J. Kittler
Milton E. Chandler
By: John A. Watson
Att'y.

CARBURETOR

Original Filed Feb. 5, 1935 4 Sheets-Sheet 3

Inventors:
Milton J. Kittler
and Milton E. Chandler.
By: John A. Walton
Att'y

Inventors:
Milton J. Kittler
Milton E. Chandler.
By:- John A. Watson
Att'y.

Reissued Apr. 22, 1941 Re. 21,774

UNITED STATES PATENT OFFICE 21,774

CARBURETOR

Milton E. Chandler, Birmingham, and Milton J. Kittler, Detroit, Mich., assignors, by direct and mesne assignments, to Chandler-Evans Corporation, Meriden, Conn., a corporation of Delaware Original No. 2,088,464, dated July 27, 1937, Serial No. 5,144, February 5, 1935. Application for reissue May 29, 1939, Serial No. 276,444

4 Claims. (Cl. 261—12)

This invention relates to carburetion devices and, more particularly, to carburetors and related apparatuses having features of such character as to make the devices and apparatuses peculiarly suitable for aircraft engines although it is not limited to such field of use.

One of the primary objects of the invention is to provide an arrangement of fuel supply and control apparatus for carburetion purposes wherein the fuel supplied under pressure from a source, such as through a fuel pump, may be controlled to provide the necessary amount of fuel at the times desired, the control being effective through mechanisms affected by atmospheric pressure variations and variations in pressure of fluids (fuel and air) passing into or through the apparatus during the functioning of the apparatus.

Another important object is to provide a novel arrangement wherein fuel supplied under pressure from a fuel pump or otherwise, is admitted to a fuel chamber of variable capacity and delivered from said chamber into the air or mixture passage leading to the intake of the engine, under controls automatically determined by varying factors incident to the engine operation and to the air supplied to the carburetor for fuel mixture purposes.

Another of the objects of this invention is to design a variable Venturi carburetor suitable for aircraft engines of the internal combustion type having external carburetor means.

Many other objects as well as the advantages and uses of the invention will be or should become apparent as this description proceeds.

The ordinary aircraft carburetor has been designed as a modified automobile carburetor in which the production requirements have been a factor. By departing from the accepted design and placing the fuel nozzle on the engine side of the throttle and utilizing the throttle means to provide a variable Venturi passage around the fuel nozzle the maximum degree of atomization is secured without the danger of freezing.

By making the carburetor of flat pieces bolted together the scrap loss due to porous castings is reduced and the cost of manufacturing these large carburetor castings is greatly reduced. A special problem has been given a specific solution.

Figure 4:
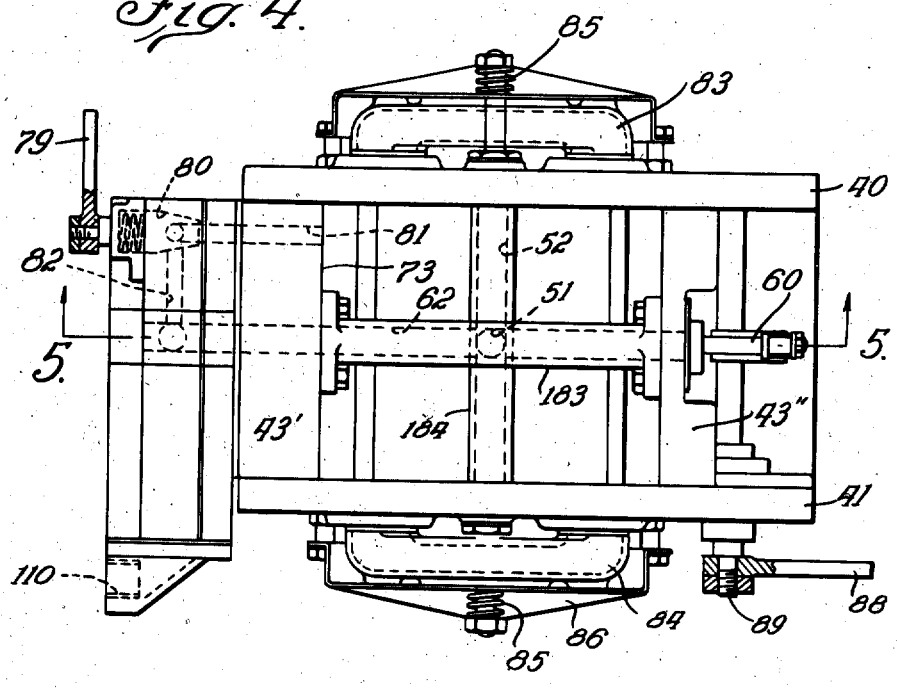
Figure 4 shows in plan an alternative construction to that shown in Figure 2.
Figure 5:
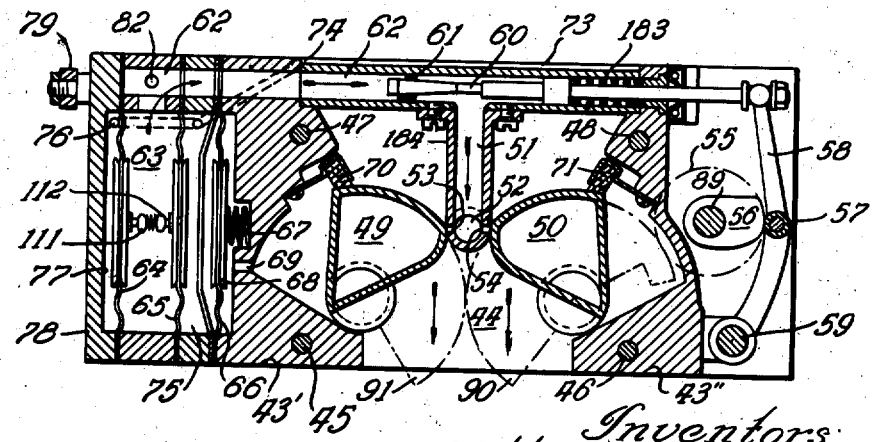
Figure 5 is a cross-section taken on plane 5—5 of Figure 4.
Figure 6:
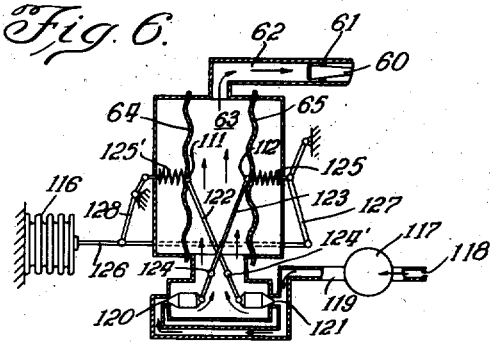

Figure 6 is a diagrammatic figure representing a part of the mechanism shown in either Figs. 1 and 2 or Figs. 4 and 5 together with an automatic altitude control, the diagram also generally representing the mechanism for controlling the supply of fuel into a variable capacity fuel chamber designated 63.

Figure 7:
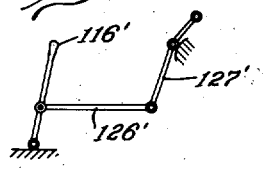

Figure 7 shows a manual altitude control to be used as an alternative control with the construction shown in Figure 6.

Figure 8:
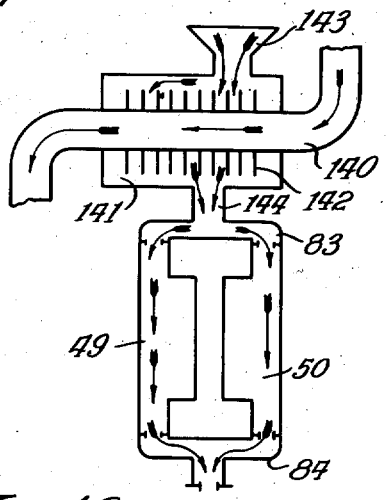

Figure 8 shows diagrammatically the method for providing hot air to the throttles.

Figure 9:
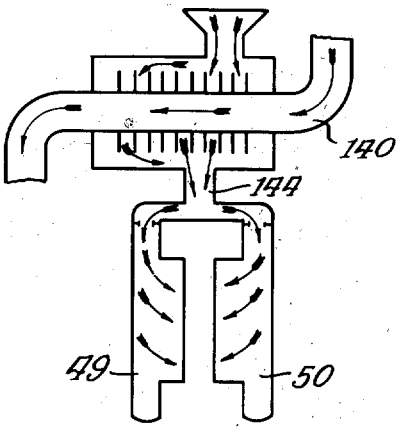

Figure 9 shows another alternative method of heating the throttle.

Figure 10:
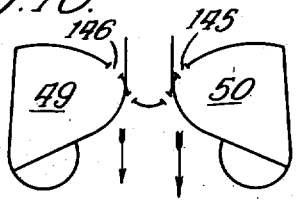

Figure 10 shows diagrammatically the arrangements of the throttles showing the outlets for the heated air.

Figure 11:
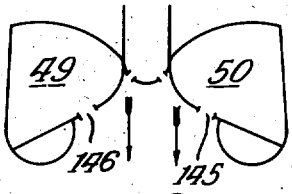

Figure 11 shows an alternative outlet for the heated air from the interior of the throttle.

Figure 12:
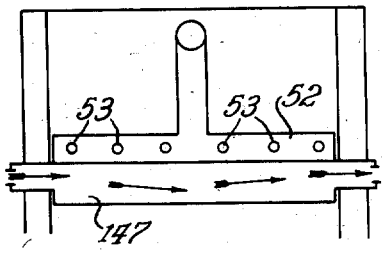
Figure 13:
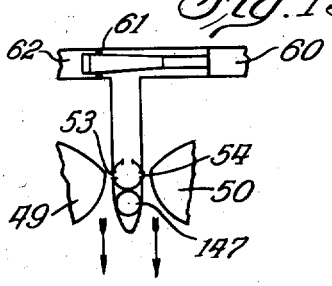

Figures 12 and 13 show diagrammatically a method for heating the fuel nozzle directly.

Figure 14:
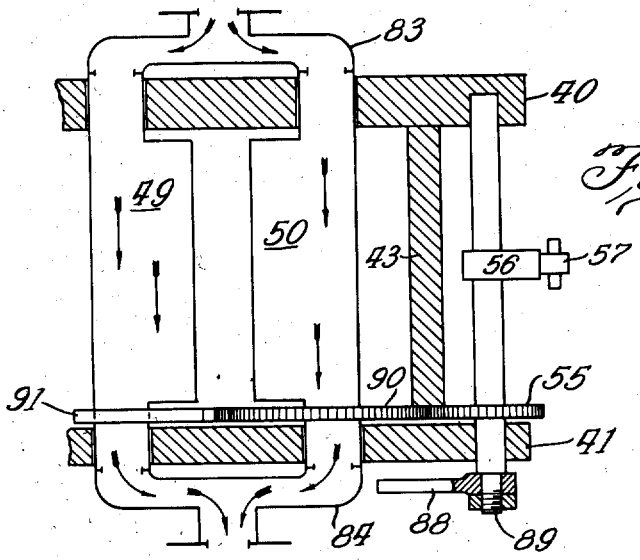

Figure 14 shows diagrammatically the heating means and the throttle control.

Figure 15:
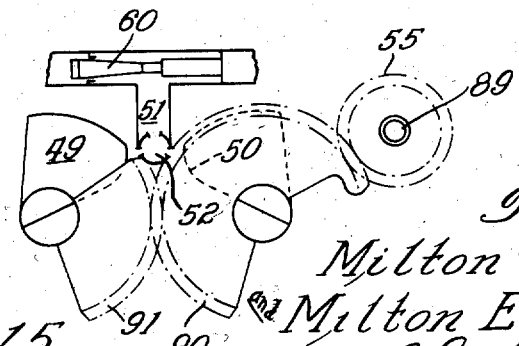

Figure 15 shows in elevation the gear train which operates the throttle control shown in Figure 14.

In Figures 1, 2, 14, and 15; 40 and 41 are two side plates which with a center piece 43 enclose the main mixing chamber 44 of the carburetor. These end plates 40 and 41 are bolted together by means of the through bolts 45, 46, 47, and 48. Located in the mixing chamber 44 are two similar hollow throttles 49 and 50. These two throttles are geared together in a well known manner. The pitch-lines of the gears are shown diagrammatically by the circles 90 and 91 Figure 2 and the gears in full lines in Figure 14, in which figure the throttles 49 and 50 are shown diagrammatically.

Figure 1:
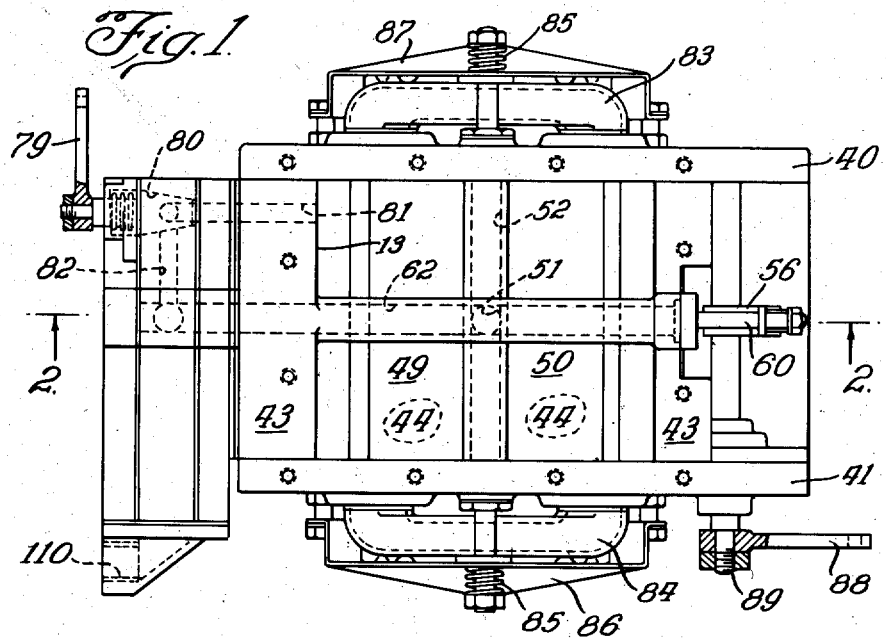
Figure 1 shows a plan view of the preferred form of construction.
Figure 2:
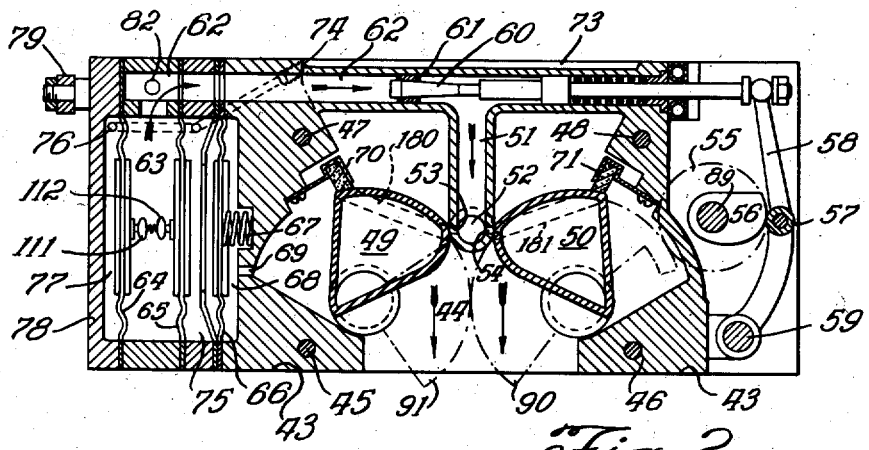
Figure 2 shows a cross-section elevation taken on plane 2—2 of Figure 1.

In Figures 1 and 2, 51 is a vertical fuel passage which leads to a second fuel passage 52 which extends transversely across the mixing chamber 44 and with which the two hollow throttles 49 and 50 are adapted to engage. It will be obvious that as the throttles open rectangular slots are opened between 52 and the throttles 49 and 50. Fuel outlets 53 and 54 are arranged to discharge along the center of the two narrow slots thus formed. The streamlined surfaces of 49 and 50 thus form a variable Venturi passage for the air. The wall of the air entrance to the carburetor is numbered 73.

Geared to the throttles 49 and 50 is a gear 55 (Figures 2 and 14) which meshes with the gear 90. The gear 55 operates a cam 56 (Figure 2) which engages with a roller 57 mounted on a lever 58 pivotally anchored at 59 to the main casting 43. This lever 58 engages with a needle 60 which controls the fuel restriction 61 in a main fuel passage 62. This fuel is supplied from a fuel supply chamber 63 which is formed between two flexible diaphragms 64 and 65, the fuel being supplied to this chamber through an inlet connection passage 110 connected (see Fig. 6) through a pipe 119 with a fuel pump 117. An automatic air pump is formed by means of two inter-communicating air chambers 75 and 77 in effect surrounding this fuel chamber 63. This air pump also comprises a third flexible diaphragm 66 supported by a spring 67 which is seated against the casting 43. This diaphragm 66 together with the casting 43 segregates a chamber 68, which communicates through a restricted passage 69 with the manifold or air and mixture passage at a place back of the throttle 49 and so is in communication with the mixing chamber 44 so that the engine suction acts on the diaphragm 66. In order to insure that this is so, a wiper 70 engages with the circular cylindrical surface of the throttle 49. A similar wiper block 71 engages with the throttle 50, thus sealing the mixing chamber 44 from the air entrance 73. End leakage is limited by rectangular pieces shown in broken lines at 180—181 Figure 2.

A restricted air vent 74 communicates with the atmosphere at a place adjacent to the air and mixture passage through the carburetor and also communicates with the air chamber 75 formed between the diaphragm 66 and the diaphragm 65. The restricted air passage 74 also communicates through a passage 76 to the other air chamber 77 formed between the diaphragm 64 and a cover 78. Passage 76 therefore provides communication between the two air chambers 77 and 75 and between these chambers and the atmosphere. In Figure 1 (upper left) 79 is a mixture control lever which may be manually or automatically operated. This lever 79 controls the cock 80 which admits air through the air entrance wall 73 through a passage 81 and across a passage 82 which discharges air directly into the fuel passage 62 Figure 2.

Figure 3:
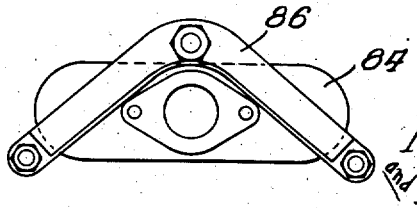
Figure 3 shows the detail of clamping the heating manifolds to the throttles.

In order to admit heat into the interior of the hollow throttles 49 and 50 two manifolds are provided, 83 and 84. (See also Figure 14.) One of the following heating means may be used through these manifolds: hot air, exhaust gas, hot oil, or hot water. 85 and 85 are springs which impose a pressure on the manifolds 83 and 84. Bridges 86 and 87 are provided so that the manifolds 83 and 84 may be held tightly against the throttles 49 and 50. This detail is shown in Figure 3. In Figure 1 (lower right), and also in Figure 14, lever 88 is the main throttle control bolted to a shaft 89 which operates the gear 55 which engages with a gear 90 and through the gear 90 with a gear 91 upon which the throttle 49 is mounted. By this means a cam 56, the throttles 49 and 50 and the needle 60 are all moved in unison.

In Figures 7 and 6 a method of controlling the fuel pressure in the fuel supply chamber 63 is shown.

In Figure 7 alternative manual means is shown for controlling the pressure and Figure 6 shows diagrammatically the preferred method of control which is by means of aneroid bellows 116. In this figure a fuel pump 117 is shown which obtains fuel from a pipe 118 and discharges its fuel through a pipe 119 past the two needle valves 120 and 121. These needle valves are connected by levers 122 and 123 pivoted at 124 and 124′ and the levers are connected with the diaphragms 64 and 65 at 111 and 112, respectively. Coil springs 125 and 125′ are used to support the diaphragms 64 and 65 and are located in chambers 75 and 77. The compression in these springs is controlled by the movement of the bellows 116 which is responsive to atmospheric pressure. Linkage 126, 127 and 128 transmits the movement of the bellows 116 so that the compression in the springs 125 and 125′ is varied as the altitude varies. In the fuel outlet 62 the restriction 61 and the needle valve 60 are as shown in Figure 2. We have discovered that the use of two diaphragms and two valves enables us to deliver seven hundred pounds of gasoline per hour at three or four pounds pressure per square inch and to withstand a pressure in the fuel pump of twenty pounds per square inch. The use of a single diaphragm and a single valve requires them both to be excessively large.

Figure 7 shows a manually operated lever 116′ adapted to be connected through linkage 126′—127′ with the spring 125′.

In Figure 8 an exhaust pipe 140 is shown passing through the center of a heat exchanger 141 in which are located a large number of fins 142 mounted on the exhaust pipe 140. An air entrance 143 admits air to flow over these fins. An outlet 144 admits air to the hollow throttles 49 and 50 through the manifold 83, the manifold 84 providing the outlet (see Figures 1 and 4). Means (not shown) are provided for drawing the air out of 84.

In Figures 9, 10, and 11 the outlet manifold 84 is dispensed with and the hot air escapes through openings 145 and 146 formed in the hollow throttles 49 and 50 either on the up stream side (Figure 10) or the down stream side (Figure 11) of the throttles.

In Figures 12 and 13 some heating medium is admitted through a passage 147 located below the fuel passage 52 from which the fuel discharges through outlets 53.

Figures 14 and 15 show diagrammatically two hollow throttles 49 and 50, which are connected with the end manifolds 83 and 84, which admit the heating fluid to the interior of the throttles. Gear wheels 55, 90 and 91 are also shown whereby the throttle shaft 89 (see Figure 1) is connected so as to rotate the two hollow throttles 49 and 50. The cam 56 is shown engaging with the roller 57 which in its turn is mounted on the lever 58, shown in Figure 2.

Figures 4 and 5 show how the central portion 43 of Figure 2 can be divided in two parts, 43′—43″, connected by a separate cross piece 183, which contains the fuel needle 60, fuel restriction 61 and fuel passage 62. Bolted to this cross piece 183 is the casting 184 containing the fuel passages 51 and 52 out of which lead the fuel nozzle 54. The difference resulting from this construction as compared with the construction shown in Figures 1 and 2 is that no cored castings are required and the production of solid castings free from blow holes is much easier to control with such solid castings than is the case when cored castings are used.

*Operation*

When the carburetor is applied to an airplane engine the speed of the engine is regulated by the rectangular area between 49 and 51 and between 51 and 50, which is determined by the opening and closing of the throttles 49 and 50. In doing so the needle valve 60 is moved by the cam 56 to permit more or less fuel to flow past the restriction 61, through the fuel openings 53 and 54, into the throat of the variable venturi formed between the throttles 49 and 50, and so into the mixture outlet 44. When the throttle is opened suddenly the low pressure in 44 is broken. The pressure in 68 therefore rises and the flexible wall 66 moves to the left under the influence of the spring 67. The flexible wall 65 then moves over to the left and the pressure in the constant pressure fuel supply chamber 63 is temporarily raised above the normal pressure which of course depends on the elastic flexibility of the wall 65. The flow through 62 is thus temporarily increased during the acceleration period of the engine.

By making 74 very small this action is prolonged for a definite period of time and by making 74 very large this action is negligible, hence 74 can be made exactly the right size to give the desired performance.

The operation of the other figures will be obvious from their description, except that in Figure 6 an increase in atmospheric pressure will compress the springs 125—125′ and a decrease in atmospheric pressure will expand the bellows 116 and thus relieve the springs 125—125′ and thus decrease the pressure of the fuel delivered through 62. Hence, as the airplane climbs the mixture ratio is maintained constant.

By means of the arrangement of diaphragms shown to the left of Figure 2 and diagrammatically in Figure 6, the carburetor is rendered less sensitive to stunting. When the inertia effects move from right to left in Figure 6, for example, the needle valve 121 is shut off, but the needle valve 120 is opened because if the inertia forces act on diaphragm 64, they also act on diaphragm 65 so that the supply of fuel to the fuel nozzle is not interrupted and the ability of the plane to maneuver is not interfered with.

We claim:

1. A fuel supply means for an aviation carburetor comprising, a fuel pump, a fuel passage leading therefrom, a fuel supply chamber having a flexible wall, a fuel outlet from said chamber, an inlet valve for controlling fuel discharge into said chamber from said fuel passage, said valve being operated by said flexible wall, spring means for supporting said wall, and means responsive to variation in atmospheric pressure for varying the compression of said spring means.

2. A fuel supply means for an aviation carburetor comprising, a source of fuel under pressure, a fuel passage leading therefrom, a fuel supply chamber having a connection with said fuel passage and having a flexible wall, a fuel outlet from said chamber, an inlet valve for controlling discharge into said chamber from said fuel passage, said valve being operated by said flexible wall, spring means for supporting said wall, and means responsive to variation in atmospheric pressure for varying the effect of said spring means.

3. Heating means for a carburetor comprising, two hollow throttles adapted to roll together to form a variable venturi, a fuel nozzle discharging between said throttles, means for circulating a heating fluid through said hollow throttles, additional heating means comprising a heating passage having an axis parallel to that of the throttles and located centrally therebetween, said fuel nozzle being associated with said heating passage so as to be heated thereby.

4. Heating means as described in claim 3 in which the additional heating means is located on the down stream side of said nozzle so as to form a stream-lining contour thereby.

MILTON E. CHANDLER.
MILTON J. KITTLER.